US008553557B2

(12) United States Patent
Ait-Ameur et al.

(10) Patent No.: US 8,553,557 B2
(45) Date of Patent: Oct. 8, 2013

(54) PROGRAMMABLE ADAPTIVE NETWORK GRID

(75) Inventors: Samir Ait-Ameur, Fremont, CA (US); Benjamin J. Parker, Vacaville, CA (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 290 days.

(21) Appl. No.: 13/046,042

(22) Filed: Mar. 11, 2011

(65) Prior Publication Data

US 2012/0230198 A1 Sep. 13, 2012

(51) Int. Cl.
*H04L 12/26* (2006.01)
*H04L 12/28* (2006.01)
*H04W 4/00* (2009.01)
*G06F 15/173* (2006.01)
*G06F 15/16* (2006.01)

(52) U.S. Cl.
USPC ........... 370/236; 370/254; 370/328; 370/331; 709/223; 709/227

(58) Field of Classification Search
USPC .......... 370/331, 254, 328, 236; 709/223, 227
See application file for complete search history.

(56) References Cited

U.S. PATENT DOCUMENTS

2010/0281151 A1* 11/2010 Ramankutty et al. .......... 709/223
2010/0329150 A1* 12/2010 Nielsen ......................... 370/254
2012/0170548 A1*  7/2012 Rajagopalan et al. ........ 370/331

OTHER PUBLICATIONS

Chung et al., Automated Cluster-Based Web Service Performance Tuning, Jun. 4-6, 2004, High Performance Distributed Computing, 2004. Proceedings. 13th IEEE International Symposium, p. 1-10.*
Ghadialy, Codec's for LTE, Feb. 23, 2010, 3G and 4G Wireless Blog, p. 1-4.*
Narten et al, IETF RFC 2461 Neighbor Discovery for IP Version 6, Dec. 1998, p. 1-87.*
Korhonen et al., IPv6 in 3GPP Evolved Packet System Draft, Feb. 10, 2011, pp. 1-31.*
ETSI TS 129 274 v8.1.1 Relase 8, UMTS; LTE; EPS; GPRS; GTPv2-C Stage 3, Apr. 2009, pp. 1-118.*

* cited by examiner

*Primary Examiner* — Andrew Lai
*Assistant Examiner* — Albert Shih

(57) ABSTRACT

A device receives a first message from a first network element of a network grid. The device determines, based on the first message, whether a threshold is reached for the first network element of the network grid. The device further reprograms, when the threshold is reached, a second network element of the network grid to function in same first role as the first network element. Prior to the reprogramming of the second network element, the second network element functions in a second role that is different from the first role. The device also shifts processing from the first network element to the second network element.

17 Claims, 7 Drawing Sheets

PROGRAMMABLE ADAPTIVE NETWORK GRID

BACKGROUND

Long term evolution (LTE) network technology has greatly improved wireless network data rates. At the same time, the number of mobile devices and the use of bandwidth-intensive applications continue to increase. To accommodate the growing use, wireless network providers have to increase the capacity of the LTE network by adding network elements. Currently, each network element is of a particular type that corresponds to a static defined role. Network providers have to provide enough network elements of each type to accommodate the maximum number of network elements, which may be needed at any one time in one location. However, since the number of network elements of each type that are needed at one time fluctuates, network elements of one type are often underutilized while network elements of another type are utilized at almost full capacity. As a result, network providers fail to optimize the use of hardware components that make up their networks and waste resources by having to continuously install extra network elements of particular types.

DETAILED DESCRIPTION OF PREFERRED EMBODIMENTS

The following detailed description refers to the accompanying drawings. The same reference numbers in different drawings may identify the same or similar elements.

An implementation, described herein, may provide a programmable adaptive network grid (herein, "network grid"). The network grid may include multiple network elements. A network controller may program each network element to act in any necessary function (e.g., as a as a packet data network (PDN) gateway (PGW), as a serving gateway (SGW), as a mobility management entity (MME), eNodeB, etc.) needed by the network grid. The network controller may receive messages from the network elements. The network controller may determine, based on a message from a first network element, that the first network element is being over-utilized (e.g., a value indicating the use of the first network element is greater than a maximum predefined threshold). The network controller may identify a second network element, which is directly linked to the first network element, functions in a different role from the first network element, and is being underutilized (e.g., a value indicating the use of the first network element is less than a minimum predefined threshold). The network controller may shift processing from the second network element to a third network element that is functioning in the different role of the second network element. Herein, processing may refer to sessions which a network element is handling, while acting in a role of a particular function, to facilitate transmission of traffic via the network grid. To shift the processing, network controller may transmit instructions to the second network element to redirect flows of processing to the third network element. Thereafter, the network controller may program the second network element to perform the same function as the first network element. The network controller may shift processing from the first network element to the newly programmed second network element. To do so here, network controller may transmit instructions to the first network element to redirect flows of processing to the second network element.

Figure 1:
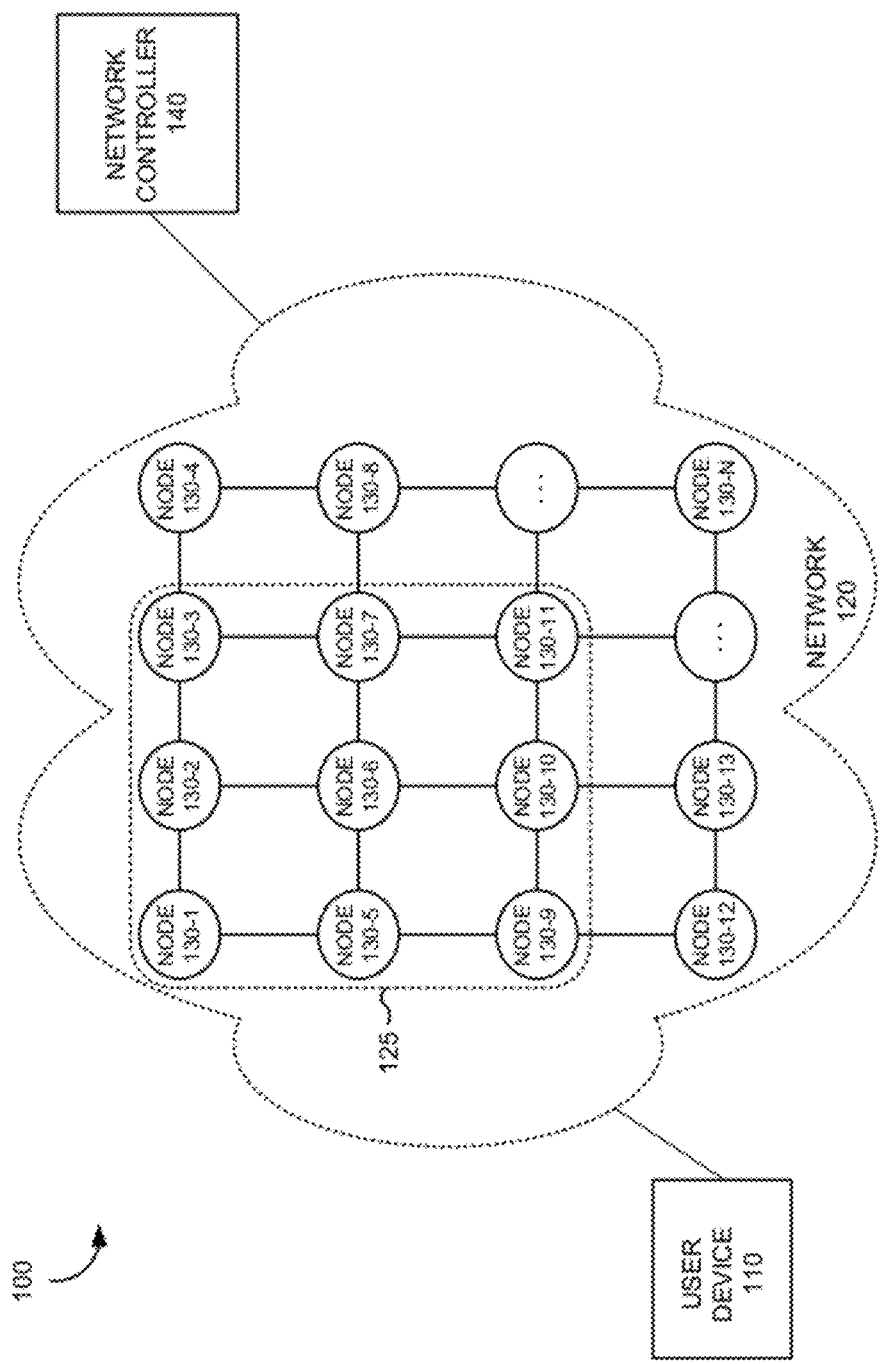
FIG. 1 is a diagram of an example environment in which systems and/or methods described herein may be implemented.

FIG. 1 is a diagram of an example environment 100 in which systems and/or methods described herein may be implemented. Environment 100 may include one or more of the following elements: a user device 110, a network 120, and a network controller 140. While FIG. 1 shows a particular number and arrangement of elements, environment 100 may include additional, fewer, different, or differently arranged elements than are illustrated in FIG. 1.

User device 110 may represent any device capable of transmitting and/or receiving data to/from network 120. User device 110 may include any computation or communication device, such as a communication device that is capable of communicating via network 120. In one implementation, user device 110 may take the form of a smart phone, a personal digital assistant (PDA), a mobile telephone device, a laptop, a handheld computer, a personal media player, etc. User device 110 may allow a user of user device 110 to access a web service via network 120.

Network 120 may represent a single network, multiple networks of a same type, or multiple networks of different types. For example, network 120 may include a cellular network (e.g., 3G network, 4G network), a wireless network (e.g., a general packet radio service (GPRS) network), a Public Switched Telephone Network (PSTN), a local area network (LAN), a wide area network (WAN) (e.g., the Internet), a metropolitan area network (MAN), a subset of the Internet, an ad hoc network, a fiber optic network (e.g., a fiber optic service (FiOS) network), or any combination of the aforementioned networks. A cellular network may include one or more of a radio access network (e.g., a long term evolution (LTE) network or an enhanced high rate packet data (eHRPD) network) and a wireless core network (e.g., an evolved packet core (EPC) network).

Network 120 may include nodes 130-1, 130-2, ..., 130-N (N≥1) (collectively referred to as "nodes 130" and individually as "node 130"). Nodes 130 may connect via a number of network links. The network links may include wired and/or wireless links. Each node 130 may connect to one or more other nodes 130. While FIG. 1 shows a particular number and arrangement of nodes 130, network 120 may include additional, fewer, different, or differently arranged nodes 130 than are illustrated in FIG. 1. One or more nodes 130 may be outside of network 120 or may be part of one or more other networks.

Node 130 may include a network device that transmits data and/or facilitates transmission of data between user device 110 and various web services. For example, node 130 may take the form of a routing device, a switching device, a multiplexing device, or a device that performs a combination of routing, switching, and/or multiplexing functions. In one implementation, node 130 may be a digital device. In another implementation, node 130 may be an optical device. In yet another implementation, node 130 may be a combination of a digital device and an optical device.

Network 120 may represent a network grid. Network 120 may be split into subsets of the network grid. Each subset of the network grid may include a particular number (e.g., 2, 4, and/or 9) of nodes. For example, network 120 may include subset 125 and one or more other subsets (e.g., the other subsets of network 120 are not shown in FIG. 1). As shown in FIG. 1, subset 125 may include nodes 130-1, 130-2, 130-3, 130-5, 130-6, 130-7, 130-9, 130-10, 130-11.

Nodes 130 may represent network elements. Network controller 140 may program each one of nodes 130 to function as an MME, a PGW, an SGW, eNodeB, and/or another type of network element. For example, as described further below in reference to FIG. 5A, network controller 140 may program node 130-1 to function as an MME, program node 130-2 to function as a PGW, program node 130-3 to function as an SGW, program node 130-5 to function as an SGW, etc. Network controller 140 may change functions of nodes 130 during the operation of network 120. For example, as described further below in reference to FIG. 5B, network controller 140 may adapt network 120 by re-programming node 130-5 to function as an MME instead of as an SGW.

Node 130, that functions as an SGW, may perform signaling conversion between a transport (e.g., X2 interface) used within an access network and a transport (e.g., IP) used within a target network. Node 130, while functioning as the SGW, may route and forward user data packets. Node 130, while functioning as the SGW, may simultaneously act as a mobility anchor for the user plane during inter-eNodeB handovers and as an anchor for mobility between LTE and other technologies. Node 130, while functioning as the SGW, may also manage and store user device contexts (e.g., parameters of an IP bearer service and network internal routing information). For example, node 130, while functioning as the SGW, may receive an instruction (e.g., as a result of a registration operation, handoff operation, and/or some other operation) from node 130 that is functioning as an MME to establish a connection (e.g., a tunnel) that permits user device 110 to communicate with other user devices and/or network elements associated with another network.

Node, 130 that functions as a PGW, may provide connectivity from user device 110 to external packet data networks by being the point of exit and entry of traffic for user device 110. Node 130, while functioning as the PGW, may perform policy enforcement, packet filtering, and/or other services relating to the access of user device 110 to an external packet data network. Node 130, while functioning as the PGW, may further connect user device 110 to core networks (e.g., the external packet data network, the Internet, etc.). For example, node 130, while functioning as the PGW, may aggregate traffic received from one or more nodes 130 that function as SGWs and may send the aggregated traffic to another network. In another example implementation, node 130, while functioning as the PGW, may receive traffic from the other network and may send the traffic to user device 110 via node 130 that functions as an SGW and/or an eNodeB.

Node 130, that functions as an MME, may perform operations associated with a handoff to and/or from a part of network 120. Node 130, while functioning as the MME, may perform operations to register user device 110 with network 120, to handoff user device 110 from the part of network 120 to another part of network 120 and/or to another network, to handoff user device 110 from the other network to network 120, and/or to perform other operations. Node 130, while functioning as the MME, may further perform policing operations on traffic destined for and/or received from user device 110.

Network controller 140 may represent any device capable of transmitting and/or receiving data to/from nodes 130. Network controller 140 may represent a single server or a collection of multiple computing devices and/or computer systems. Network controller 140 may receive messages from nodes 130. Network controller 140 may control, adapt, operate, program, and/or re-program nodes 130. Network controller 140 may reprogram nodes 130 to function as particular types of network elements based on the messages received from nodes 130. Network controller 140 may be directly connected to network 120 or indirectly connected through a router, a switch, a bridge, a firewall, a gateway, etc. In another implementation, network controller 140 may be part of network 120 and/or operate as one of nodes 130.

Figure 2:
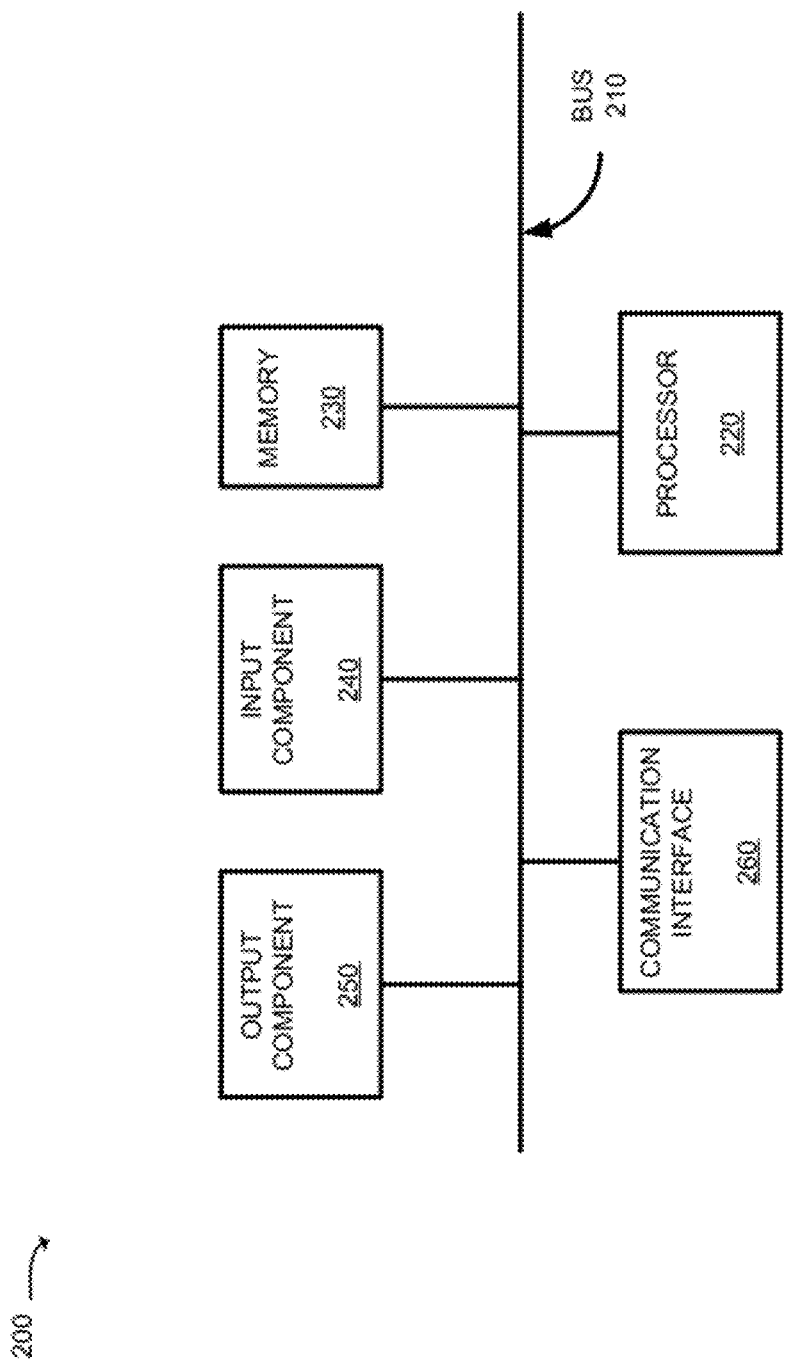
FIG. 2 is a diagram of example components of one or more of the devices of FIG. 1.

FIG. 2 is a diagram of example components of a device 200. Device 200 may correspond to user device 110 and/or network controller 140. Alternatively, or additionally, each one of user device 110 and/or network controller 140 may include one or more devices 200 and/or one or more of each one of the components of device 200.

Device 200 may include a bus 210, a processor 220, a memory 230, an input component 240, an output component 250, and a communication interface 260. In other implementations, device 200 may contain fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

In another implementation, communication interface 260 may include, for example, a transmitter that may convert baseband signals from processor 220 to radio frequency (RF) signals and/or a receiver that may convert RF signals to baseband signals. Alternatively, communication interface 260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 260 may connect to an antenna assembly (not shown in FIG. 2) for transmission and/or reception of the RF signals.

The antenna assembly may include one or more antennas to transmit and/or receive RF signals over the air. The antenna assembly may, for example, receive RF signals from communication interface 260 and transmit them over the air, and receive RF signals over the air and provide them to communication interface 260. In one implementation, for example, communication interface 260 may communicate with network 120 and/or devices connected to network 120.

As will be described in detail below, device 200 may perform certain operations. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
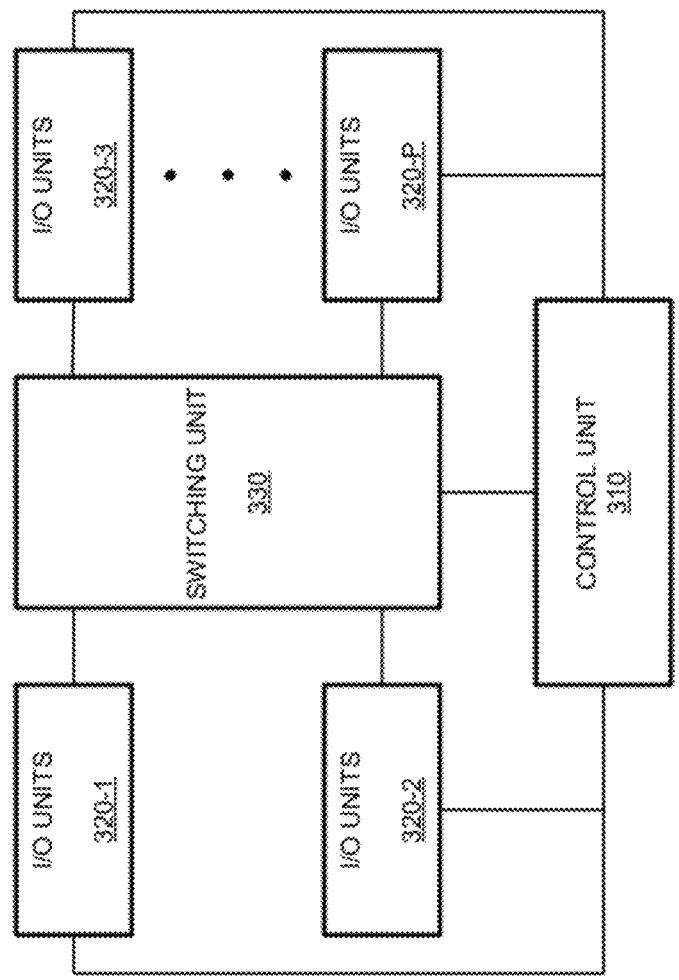
FIG. 3 is a diagram of example components of one or more of the nodes of FIG. 1.

FIG. 3 is a diagram of example components of node 130. Node 130 may include one or more of each of the components of FIG. 3. Node 130 may include a data transfer device, such as a gateway, a switch, a firewall, a network interface card (NIC), a router, a hub, a bridge, a proxy server, an optical add-drop multiplexer (OADM), or some other type of device that processes and/or transfers traffic.

Node 130 may receive network traffic, as one or more packet stream(s), from physical links, may process the packet stream(s) to determine destination information, and may transmit the packet stream(s) out on links in accordance with the destination information. Node 130 may include a control unit 310, a set of input/output (I/O) units 320-1, ..., 320-P (where P≥1) (hereinafter referred to collectively as "I/O units 320" and individually as "I/O unit 320"), and a switching unit 330. In other implementations, node 130 may include additional components, fewer components, different components, or differently arranged components than those illustrated in FIG. 3. Additionally, or alternatively, one or more operations described as being performed by a particular component of node 300 may be performed by one or more other components, in addition to or instead of the particular component of node 300.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for node 130. For example, control unit 310 may maintain the connectivity and manage information/data necessary for transferring packets by node 130. Control unit 310 may create routing tables based on network topology information, create forwarding tables based on the routing tables, and communicate the forwarding tables to I/O units 320. I/O units 320 may use the forwarding tables to perform route lookup for incoming packets and perform the forwarding functions for node 130. Control unit 310 may also perform other general control and monitoring functions for node 130.

I/O unit 320 may include a component or collection of components to receive incoming packets, to process incoming and/or outgoing packets, and/or to transmit outgoing packets. For example, I/O unit 320 may include I/O ports, a packet forwarding component (PFC), an Ethernet interface and/or another type of interface, a central processing unit (CPU), and/or a memory device. I/O unit 320 may include a collection of ports that receive or transmit packets via physical links. I/O unit 320 may also include packet processing component(s), switch interface component(s), Internet processor component(s), memory device(s), etc.

Each of I/O units 320 may be connected to control unit 310 and switching unit 330. I/O units 320 may receive packet data on physical links connected to a network (e.g., network 120). Each physical link could be one of many types of transport media, such as an optical fiber or an Ethernet cable.

I/O units 320 may process incoming packet data prior to transmitting the data to another I/O unit 320 or the network. I/O units 320 may perform route lookups for the data using the forwarding table from control unit 310 to determine destination information. If the destination information indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination information indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

As will be described in detail below, node 130 may perform certain operations associated with call processing and/or data transfer. Node 130 may perform these operations in response to control unit 310 and/or one or more I/O units 320 executing software instructions contained in a computer-readable medium, such as a memory associated with control unit 310 and/or the one or more I/O units 320, respectively. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

As described above, each node 130 may send a certain message to network controller 140 and/or other nodes 130. In one implementation these messages may take the form of a programmable adaptive LTE node (PALN) message. A PALN message may convey information regarding a particular node 130 that sends the messages and information regarding other nodes that are directly linked to the particular node 130.

Figure 4:
FIG. 4 is a diagram of an example format of a programmable adaptive LTE node (PALN) message.

FIG. 4 is a diagram of an example format of a programmable adaptive LTE node (PALN) message 400 (herein, referred to as PALN message 400). In one implementation, node 130 may generate message 400 in accordance with a PALN protocol format. Node 130 may transmit PALN message 400 to network controller 140 and/or to other nodes 130.

PALN message 400 may include a collection of fields, including, for example, an LTE grid identifier (ID) field 405, a PALN ID field 410, a PALN status field 415, a PALN role field 420, a PALN key performance indicator (KPI) index field 425 (herein, referred to as PKI field 425), a linked PALN network elements (NEs) field 430 (herein, referred to as LPN field 430), and/or a linked PALN NEs' role status field (herein, referred to as LPNRS field 435). In other implementations, PALN message 400 may include fewer fields, different fields, additional fields, differently arranged fields, and/or different-sized fields than depicted in FIG. 4. Additionally, or alternatively, one or more fields of PALN message 400 may include information described as being included in one or more other fields of PALN message 400.

LTE grid ID field 405 may store information associated with a subset of network 120 of which node 130 that generates PALN message 400 is a part. In one implementation, a size of the information in LTE grid ID field 405 may equal, for example, 1 byte. For example, assume that node 130-2 generates PALN message 400. As shown in FIG. 1, subset 125 may include node 130-2. Accordingly, LTE grid ID field 405 of PALN message may include an identifier of subset 125.

PALN ID field 410 may store information associated with an identifier of node 130 that generates PALN message 400. In one implementation, a size of the information in PALN ID field 410 may equal, for example, 2 bytes. For example, PALN message 400, generated by node 130-2, may include an identifier corresponding to node 130-2 in PALN ID field 410.

PALN status field 415 may store information associated with a status of node 130. In one implementation, a size of the information in PALN status field 415 may equal, for example, 1 bit. Accordingly, in this implementation, PALN status field 415 may equal a value of 0 or 1. For example, the value "0" may indicate that node 130-2 is active, while the value "1" may indicate that node 130-2 is not active. Node 130-2 may indicate, in PALN status field 415, that node 130-2 is active when node 130-2 is functioning as a network element of network 120 at a time when node 130-2 generates PALN message 400.

PALN role field 420 may store information associated with a function of node 130. In one implementation, a size of the information in PALN role field 420 may equal, for example, 1 byte. As described above, network controller 140 may program node 130 to function in a role as one of a multiple types of network elements. In one example implementation, the types of roles of network elements may include, for example, an MME, a PGW, an SGW, an eNodeB, etc. PALN role field 420 may identify one of the types as the function of the node. For example, network controller 140 may program node 130-2 to function as a PGW. Node 130-2 may indicate in PALN role field 420, while generating PALN message 400, that node 130-2 is functioning as a PGW.

PKI field 425 may store information associated with a performance of node 130. In one implementation, a size of the information in PKI field 425 may equal, for example, 3 bits. Node 130 may store one or more algorithms for determining a value, for node 130, on a predefined KPI index. Node 130 may determine the value, by using the one or more algorithms, based on KPI features, including, for example, one or more of network congestion associated with node 130, performance of node 130, how many sessions are processed in a predefined period of time (e.g., 1 second) by node 130, bandwidth utilization associated with node 130, latency associated with node 130, throughput associated with node 130, memory utilization of node 130, percentage of packets dropped by node 130 (i.e., packet loss), etc.

For example, in one example implementation, a maximum value of a KPI index may equal 100. Node 130-2 may determine network congestion of node 130-2 and performance of node 130-2. Node 130-2 may use an algorithm to calculate, based on the network congestion and the performance, that node 130-2 is operating at half of its capacity. Accordingly, node 130-2 may calculate a value of 50 for PKI field 425, while node 130-2 is generating PALN message 400.

LPN field 430 may store information that identifies network elements that are directly linked to node 130. In one implementation, a size of the information in LPN field 430 may equal, for example, 2 bytes. For example, as shown in FIG. 1, node 130-2 may directly link to node 130-1, node 130-3, and node 130-6. LPN field 430, of a PALN message 400 generated by node 130-2, may include identifiers that correspond to node 130-1, node 130-3, and node 130-6.

LPNRS field 435 may store information associated with functions of network elements that are directly linked to node 130. In one implementation, a size of the information in LPNRS field 435 may equal, for example, 2 bits. For example, as described further below in reference to FIG. 5A, at a point in time when node 130-2 generates PALN message 400, node 130-1 may function as an MME, node 130-3 may function as an SGW, and node 130-6 may function as an SGW. LPNRS field 435, of a PALN message 400 generated by node 130-2, may include information that indicates that node 130-1, node 130-3, and node 130-6 are currently functioning as the MME, the SGW, and the SGW, respectively.

Figure 5A:
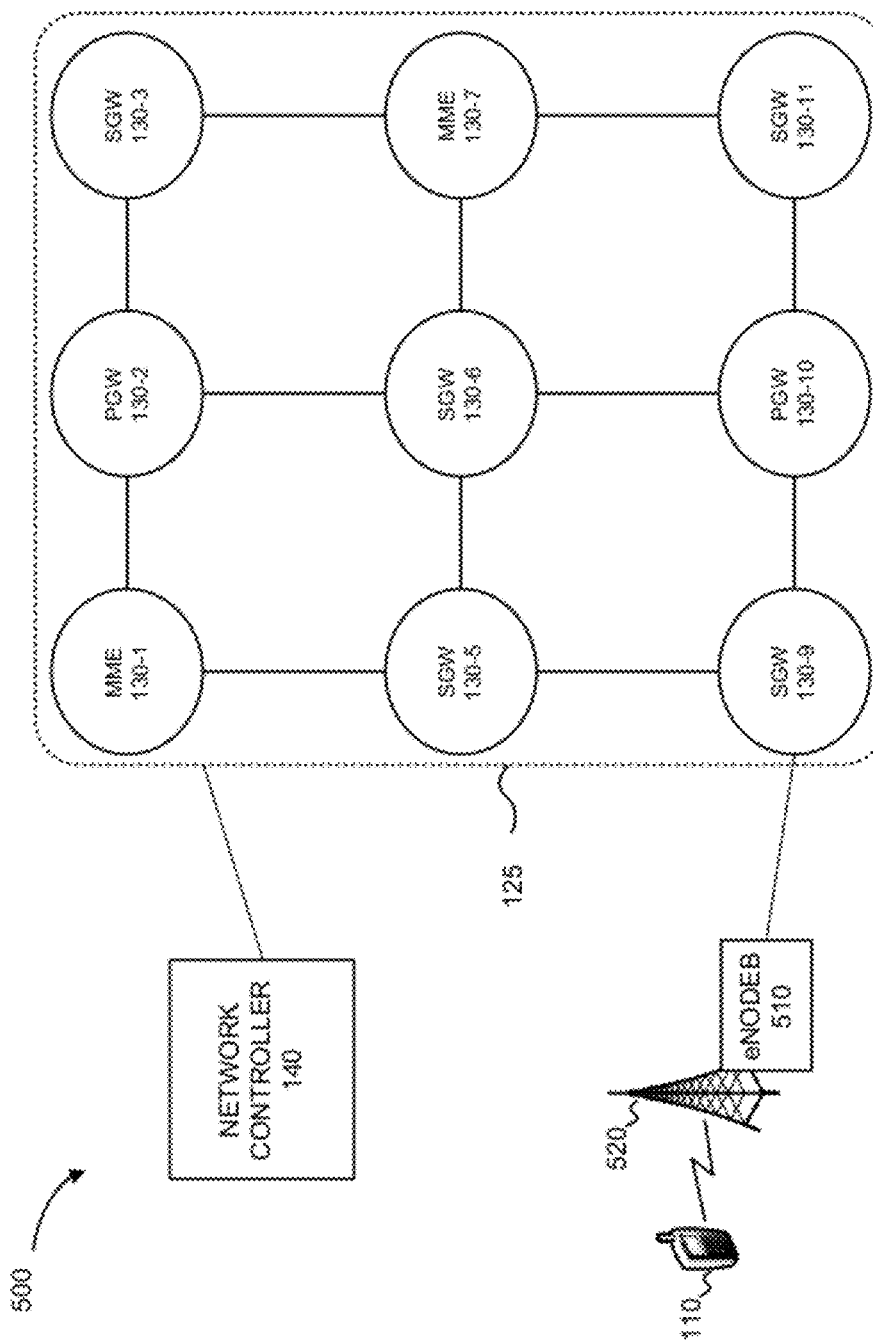
FIGS. 5A and 5B are diagrams of an example portion of the example environment of FIG. 1.

FIG. 5A is a diagram of an example portion 500 of environment 100. Portion 500 may include user device 110, eNodeB 510, an antenna 520, a subset 125 of network 120, and network controller 140. Portion 500 may represent network 120 after network controller programs each one of nodes 130 of subset 125 to function in a role as an MME, an SGW, or a PGW. Hereafter, node 130 may be referred to by the role of node 130. For example, as shown in FIG. 5A, subset 125 may include an MME 130-1, a PGW 130-2, an SGW 130-3, an SGW 130-5, an SGW 130-6, an MME 130-7, an SGW 130-9, a PGW 130-10, and an SGW 130-11.

eNodeB 510 may be a radio interface node. eNodeB 510 may be associated with corresponding antenna 520. eNodeB 510 may be connected (e.g., via a wired connection, via an X2 interface, via radio network controllers (RNCs)) to one or more other eNodeBs. eNodeB 510 may include hardware to communicate with user device 110 using WDCMA/TD-SCDMA (Wideband Code Division Multiple Access/Time Division Synchronous Code Division Multiple Access) as the air interface technology. In another implementation, eNodeB 510, antenna 520, and/or network controller 140 may also function as network elements of network 120 and correspond to one or more of nodes 130.

Each one of MME 130-1, PGW 130-2, SGW 130-3, SGW 130-5, SGW 130-6, MME 130-7, SGW 130-9, PGW 130-10, and/or SGW 130-11 may generate PALN messages associated its individual status. Network controller 140 may receive the PALN messages from MME 130-1, PGW 130-2, SGW 130-3, SGW 130-5, SGW 130-6, MME 130-7, SGW 130-9, PGW 130-10, and SGW 130-11.

For example, network controller 140 may receive a PALN message from MME 130-1. Network controller 140 may determine that a value (e.g., 70) in the PKI field, of the PALN message, is above a predefined threshold (e.g., 65). In response, network controller 140 may reprogram another network element to function as an MME to ease the burden of MME 130-1. Reducing the burden of MME 130-1 may include reducing part of the capacity which MME 130-1 is utilizing to perform MME processing and/or reducing the PKI value for MME 130-1, as further described below. Network controller 140 may further determine that SGW 130-5, which is directly linked to MME 130-1, is running at only 5% of its capacity. Network controller 140 may make the determination based on the value in a PKI field of a PALN message received from SGW 130-5.

Thereafter, network controller 140 may proceed to identify another network element that is functioning as an SGW that may take over the current SGW processing being conducted by SGW 130-5. Network controller 140 may determine that SGW 130-6 and SGW 130-9 are directly linked to SGW 130-5 and are currently functioning as SGWs. Assume, for example, that SGW 130-6 is functioning at 35% capacity and that SGW 130-9 is functioning at 10% capacity. In one implementation, for example, network controller 140 may us a particular technique to select an SGW to take over the SGW processing from SGW 130-5. Network controller 140 may shift all SGW processing from SGW 130-5 to SGW 130-9 because it has more free capacity than SGW 130-6. In another implementation, network controller 140 may split the SGW processing (evenly or unevenly) between SGW 130-6 and SGW 130-9. In yet another implementation, network controller 140 may randomly select between SGW 130-6 and SGW 130-9 or use another technique to select one SGW over another or to determine how much of the SGW processing to give each SGW.

Figure 5B:
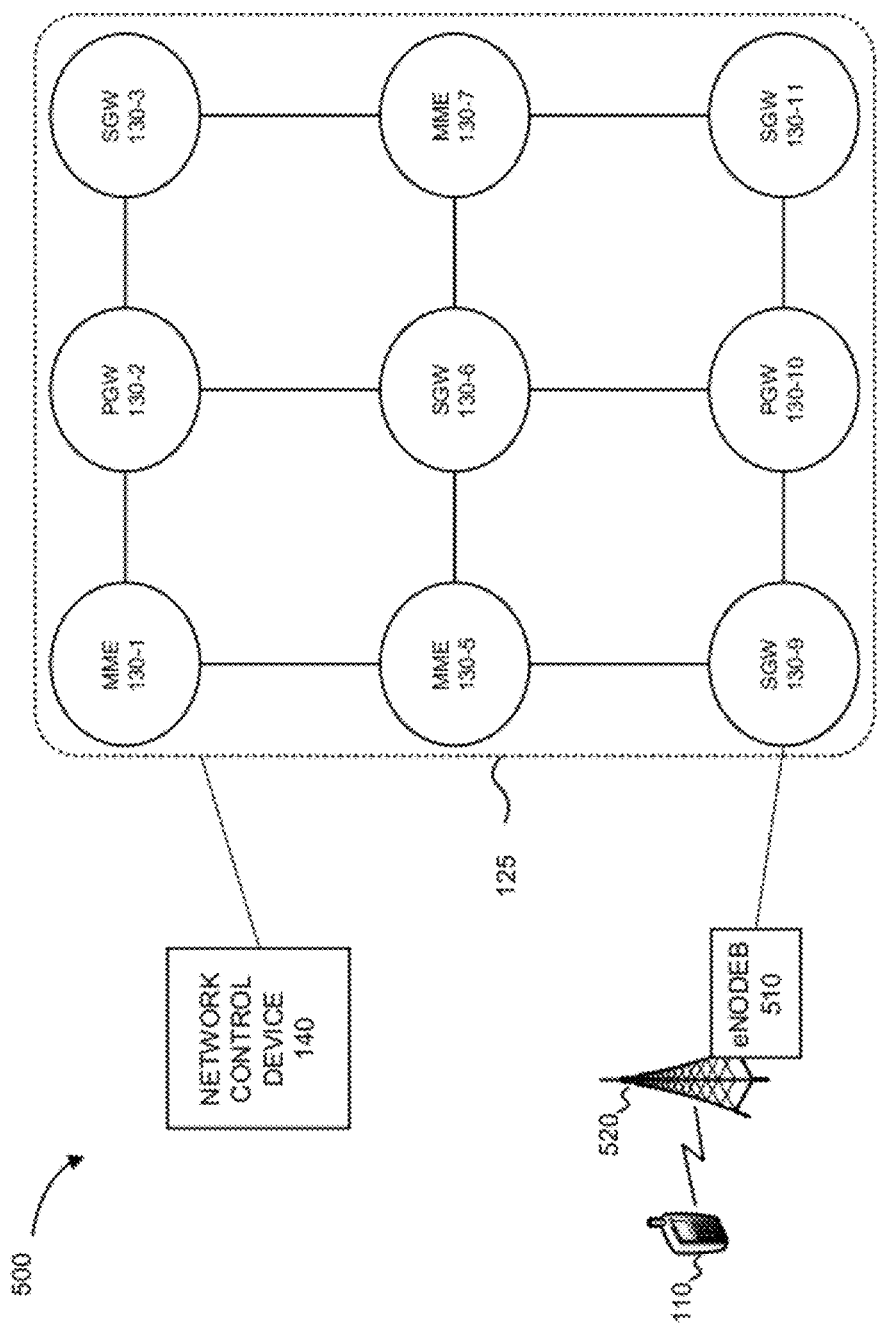

Afterwards, network controller 140 may program node 130-5 to function as an MME, as shown in FIG. 5B. FIG. 5B illustrates portion 500 after network controller 140 allocates node 130-5 to function as MME 130-5. After the allocation, network controller 140 may shift a part (e.g., 50%) of MME processing from MME 130-1 to MME 130-5.

Figure 6:
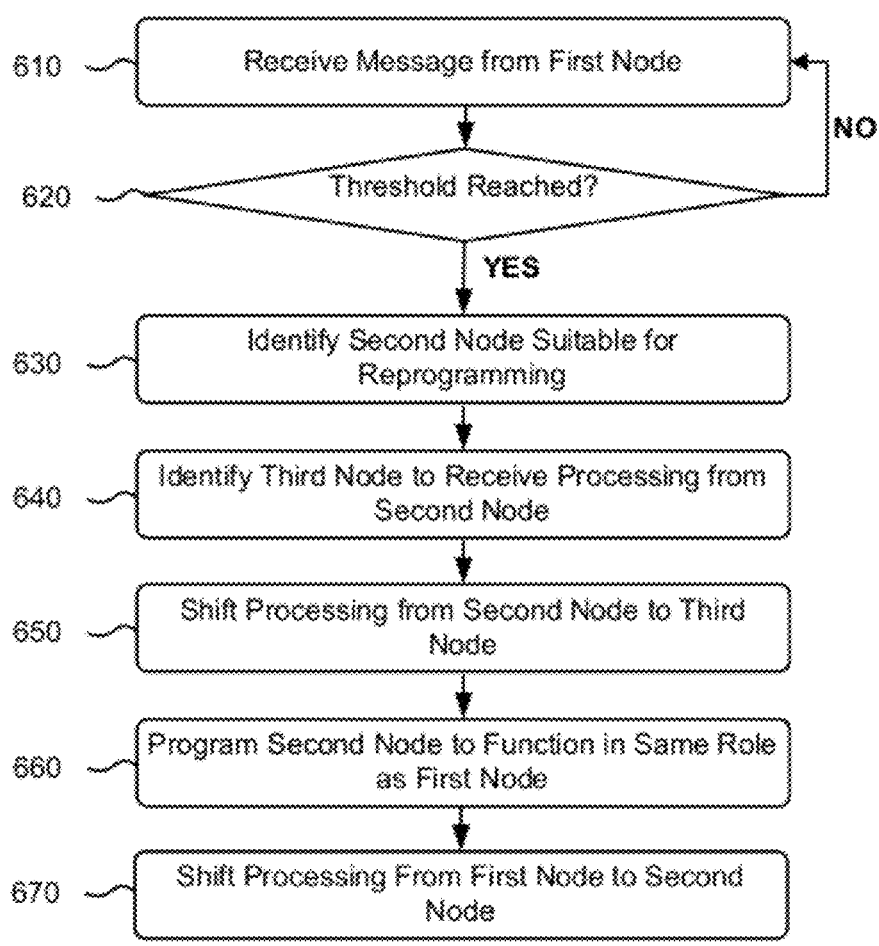
FIG. 6 is a flowchart of an example process for providing a programmable adaptive network grid.

FIG. 6 is a flowchart of an example process 600 for providing a programmable adaptive network grid. Network controller 140 may perform process 600. Alternatively, process 600 may be performed by one or more other devices, alone or in combination with network controller 140.

In one implementation, each node 130 of network 120 may have an initial predefined function (as a MME, an SGW, or a PGW) before process 600 begins (e.g., before network 120 handles any traffic). In another implementation, network controller 140 may assign initial functions to nodes 130 based on a preconfigured algorithm before process 600 begins. Network 120 may transmit traffic to and from user device 110. Nodes 130 of network 120 may facilitate the transmission of traffic in their different roles.

Process 600 may include receiving a message from a first node (block 610). For example, MME 130-1, of FIG. 5A, may generate a PALN message. To do so, MME 130-1 may determine what subset of a network grid of network 120 MME 130-1 is in and an identifier of MME 130-1. MME 130-1 may include an identifier of the subset (e.g., an identifier corresponding to subset 125) in an LTE grid identifier field (e.g., LTE grid ID field 405) of the PALN message. MME 130-1 may include the identifier of MME 130-1 in a PALN ID field (e.g., PALN ID field 410) of the PALN message. MME 130-1 may further determine that MME 130-1 is active and that MME 130-1 is functioning in a role of a MME. MME 130-1 may include "0" to indicate that MME 130-1 is active in a PALN status field (e.g., PALN status field 415) of the PALN message. MME 130-1 may include an identifier corresponding to "MME" in a PALN role field (e.g., PALN role field 420) of the PALN message.

MME 130-1 may also retrieve an algorithm to calculate a PKI value. MME 130-1 may determine values for KPIs, including, for example, a network congestion of MME 130-1, latency associated with MME 130-1, etc. MME 130-1 may calculate the PKI value based on the values of the KPIs by using the retrieved algorithm. MME 130-1 may include the PKI value in a PKI field (e.g., PKI field 425) of the PALN message. MME 130-1 may also determine that MME 130-1 is directly linked to PGW 130-2 and SGW 130-5. MME 130-1 may include identifiers that correspond to node 130-2 and node 130-5 in an LPN field (e.g., LPN field 430) of the PALN message. MME 130-1 may include information indicating that node 130-2 is currently functioning as a PGW and that node 130-5 is currently functioning as a SGW in an LPNRS field (e.g., LPNRS field 435) of the PALN message. MME 130-1 may transmit the PALN message to network controller 140. Network controller 140 may receive the PALN message from the first node, which in this example is MME 130-1.

Whether a threshold is reached may be determined (block 620). For example, network controller 140 may retrieve the PKI value for MME 130-1 from the PKI field of the PALN message. Network controller 140 may retrieve a predefined maximum threshold. The maximum threshold may represent a value that is used to determine when network controller 140 should consider reprogramming another network element (i.e., node 130) to assume the same role as the network element that reached the maximum threshold. Network controller 140 may determine whether the PKI value is equal to and/or greater than the maximum threshold. If the maximum threshold is not reached (i.e., the value is not equal to and/or greater than the maximum threshold) (block 620—NO), then network controller 140 may wait for an updated PALN message from node 130-1 (that is now functioning as MME 130-1) (block 610).

If the maximum threshold is reached (i.e., the value is equal to and/or greater than the maximum threshold) (block 620—YES), a second node that is suitable for reprogramming may be identified (block 630). For example, network controller 140 may determine that PGW 130-2 and SGW 130-5 are directly connected to the first node (e.g., MME 130-1) based on the LPN field and the LPNRS field of the PALN message received from the first node. In one implementation, based on a PALN message received from PGW 130-2, network controller 140 may determine a PKI value associated with PGW 130-2. Assume, for example, that the PKI value of PGW 130-2 indicates that PGW 130-2 is operating at 30% of its capacity. Network controller 140 may determine that PGW 130-2 is not suitable for reprogramming because the PKI value of PGW 130-2 is not less than a minimum predefined threshold (e.g., a threshold indicating 15% capacity). Additionally, or alternatively, network controller 140 may determine that PGW 130-2 is not suitable for reprogramming because PGW 130-2 is not directly connected to any other nodes 130 that are functioning as PGWs (e.g., that is because the PGW processing may not be directly shifted from PGW 130-2 to any other node 130).

Assume that a PKI value of SGW 130-5 indicates that SGW 130-5 is operating at 5% of its capacity. Also, assume that SGW 130-6 and/or SGW 130-9 are operating at 40% capacity. Accordingly, network controller 140 may determine that SGW 130-5 is suitable for reprogramming because its PKI value is below the minimum predefined threshold and/or because SGW processing may be directly shifted from SGW 130-5 to SGW 130-6 and/or SGW 130-9.

A third node, to receive processing from the second node, may be identified (block 640). For example, while or after identifying the second node, as described above, network controller 140 may identify a third node that may receive all of the processing from the second node. The third node may meet the following criteria: the third node is directly linked to the second node; the third node may function in the same role as the second node; and/or the third node has a low PKI value. The third node may have a low PKI value when, for example, the PKI value of the third node is below a third predefined threshold, the third node has enough capacity to receive the processing from the second node without increasing the PKI value of the third node over the maximum threshold, etc.

For example, assume that the PKI value of SGW 130-6 indicates that SGW 130-6 is operating at 45% of its capacity and that the PKI value of SGW 130-9 indicates that SGW 130-9 is operating at 30% capacity. In one implementation, network controller 140 may select SGW 130-9 to act as the third node because its capacity is lower than that of SGW 130-6. In another implementation, network controller 140 may select SGW 130-9 based on another predefined algorithm (e.g., select based on a predefined order, based on predefined criteria, etc.). In yet another implementation, network controller 140 may select both SGW 130-6 and SGW 130-9 to act as the third node for process 600. Network controller 140 may identify the selected node (e.g., SGW 130-9) as the third node.

Processing may be shifted from the second node to the third node (block 650). For example, after identifying SGW 130-9 as the third node, network controller 140 may shift all of the SGW processing from SGW 130-5 to SGW 130-9. In another implementation, as discussed above, network controller 140 may identify both SGW 130-6 and SGW 130-9 as the third node. Network controller 140 may split all of the SGW processing of SGW 130-5 into a first part and a second part evenly or by using a predefined algorithm (e.g., the algorithm may determine sizes of the first part and the second part based on capacities of SGW 130-6 and SGW 130-9). Network controller 140 may shift the first part of the SGW processing from SGW 130-5 to SGW 130-6. Network controller 140 may shift the second part of the SGW processing from SGW 130-5 to SGW 130-9. Thereafter, SGW 130-5 may no longer perform any SGW processing.

The second node may be programmed to function in the same role as the first node (block 660). For example, as discussed above, network controller 140 may identify SGW 130-5 as the second node. After shifting the SGW processing from SGW 130-5, network controller 140 may program the second node, node 130-5, to function in the same role as the first node, MME 130-1. Thereafter, as shown in FIG. 5B, node 130-5 may function as MME 130-5. Accordingly, MME 130-5 may perform MME processing.

Processing may be shifted from the first node to the second node (block 650). For example, network controller 140 may determine what part of MME processing being conducted by MME 130-1 should be shifted to newly programmed MME 130-5. Network controller 140 may shift the part of the MME processing from MME 130-1 to MME 130-5. In one implementation, shifting the part may reduce the PKI value for MME 130-1 below the maximum threshold, below another predefined threshold, or by a particular amount. In another implementation, shifting the part may cause the PKI value for MME 130-1 to equal a PKI value for MME 130-5 (e.g., by evenly distributing the MME processing between MME 130-1 and MME 130-5).

Process 600 may occur continuously. In another implementation, process 600 may occur simultaneously for multiple different nodes 130 of network 120. For example, after receiving a PALN message from MME 130-1, network controller 140 may begin a first process 600 to program another node 130 to act in a role of an MME. Before the first process 600 is complete, network controller 140 may begin a second process 600 to program another node to act in a role of an SGW after receiving a PALN message from SGW 130-3. While conducting the different processes 600, network controller 140 may determine how to reprogram different nodes 130 and/or set the thresholds based on the PALN messages being received from nodes 130.

In yet another implementation, network controller 140 may determine (e.g., estimate) a cost associated with reprogramming one or more nodes 130. For example, reprogramming one node 130 may cause a ripple effect that may cause that may prompt reprogramming several other nodes. In this implementation, network controller may reprogram one node 130 if only the estimated cost for reprogramming node 130 is below a predefined threshold.

The foregoing description provides illustration and description, but is not intended to be exhaustive or to limit the invention to the precise form disclosed. Modifications and variations are possible in light of the above teachings or may be acquired from practice.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code-it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a computing device, a performance value for a first node of a network grid;
   determining, by the computing device, whether the performance value is equal or greater than a first threshold;
   identifying, by the computing device, a second node of the network grid when the performance value is equal or greater than the first threshold;
   identifying a third node of the network grid;
   wherein the third node functions in a second role different from a role of the first node and is directly linked to the second node;
   shifting processing from the second node to the third node;
   reprogramming, by the computing device, the second node to function in the role of the first node, wherein, prior to the reprogramming of the second node, the second node functions in the second role; and shifting, by the computing device, processing from the first node to the second node.

2. The method of claim 1, where the role of the first node is one of a packet data network (PDN) gateway (PGW), a serving gateway (SGW), a mobility management entity (MME), or eNodeB.

3. The method of claim 1, where the second node is directly linked to the first node.

4. The method of claim 3, wherein identifying the second node comprises:

determining whether a network element linked to the first node is suitable as the second node, wherein the network element s suitable as the second node when the network element currently functions in the second role different from the role of the first node and when the network element is directly linked to the third node that functions in the second role, determining a second performance value for the network element when the network element is suitable as the second node, and identifying the network element as the second node when the second performance value is below a second threshold or when the third node has enough free capacity to receive all processing from the network element.

5. The method of claim 1, where determining the performance value for the first node comprises:

receiving a message from the first node, and retrieving the performance value from a first field of the message, where the performance value is based on one or more of network congestion associated with the first node, packet loss associated with the first node, throughput associated with the first node, or latency associated with the first node.

6. The method of claim 5, where the message further comprises:

a second field that comprises an identifier of the second node and any other nodes directly linked to the first node, and a third field that comprises information about a current role of the second node and current roles of the other nodes.

7. A computing device, comprising:

a memory to store a plurality of instructions; and a processor to execute instructions in the memory to:

receive a first message from a first network element of a network grid, determine, based on the first message, whether a first threshold is reached for the first network element of the network grid, reprogram, when the first threshold is reached, a second network element of the network grid to function in same first role as the first network element, and shift processing from the first network element to the second network element, wherein, prior to the reprogramming of the second network element, the second network element functions in a second role that is different from the first role, and wherein, after shifting the processing from the first network element to the second network element, the processor is further to:

receive a second message from the second network element, determine, based on the second message, whether another threshold is reached for the second network element, program a third network element of the network grid to function in the second role when the other threshold is reached, and shift current processing from the second network element to the third network element.

8. The computing device of claim 7, where the processor is further to:

identify, based on the first message, linked network elements that are directly linked to the first network element, where the linked network elements comprise the second network element, determine, based on the second message, whether the second network element is performing under a second threshold, and identify the second network element, for the reprogramming of the second network element, when the second network element is performing under the second threshold.

9. The computing device of claim 8, where, when determining whether the second network element is performing under the second threshold, the processor is further to:

retrieve a performance value from the second message, retrieve the second threshold, and determine that the second network element is performing under the second threshold when the performance value is less than or equal to the second threshold.

10. The computing device of claim 7, where the processor is further to:

identify linked network elements that are directly linked to the second network element, where the linked network elements comprise the first network element and the third network element of the network grid, determine, before the reprogramming of the second network element, whether the third network element functions in the second role, and shift, before the reprogramming of the second network element, all processing from the second network element to the third network element when the third network element functions in the second role.

11. The computing device of claim 7, where the role of the first network element is one of a packet data network (PDN) gateway (PGW), a serving gateway (SGW), a mobility management entity (MME), or eNodeB.

12. The computing device of claim 7, where the network grid is a long term evolution (LIE) network.

13. One or more non-transitory computer-readable media storing instructions executable by one or more processors of a computing device, the media storing one or more instructions for:

determining whether a first performance value of a first node of a network is greater than a first threshold, where the first node functions in a first role;

identifying a second node of the network when the first performance value is greater than the first threshold, wherein the second node is directly linked to the first node, where a second performance value of the second node is less than a second threshold, and wherein the second node functions in a second role that is different from the first role;

identifying a third node of the network, wherein the third node is directly linked to the second node, and wherein a third performance value of the third node is less than a third threshold, and wherein the third node functions in the second role; and moving processing from the second node to the third node;

adapting the second node to function in the first role instead of the second role; and moving processing from the first node to the second node after adapting the second node to function in the first role instead of the second role.

14. The media of claim 13, where the third threshold is equal to a difference between the first threshold and the second performance value.

15. The media of claim 13, further storing instructions for:

receiving a message from the first node, where the message comprises at least one of the first performance value, information indicating the first role of the first node, an identifier of the second node, or information indicating the second role of the second node.

16. The media of claim 13, where the first performance value is a value of a performance index, and where the performance index represents performance based on one or more of network congestion, packet loss, throughput, or latency.

17. One or more non-transitory computer-readable media storing instructions executable by one or more processors of a computing device, the media storing one or more instructions for:

determining whether a first performance value of a first node of a network is greater than a first threshold, where the first node functions in a first role;

identifying a second node of the network when the first performance value is greater than the first threshold, where the second node is directly linked to the first node, where a second performance value of the second node is less than a second threshold, and where the second node functions in a second role that is different from the first role;

adapting the second node to function in the first role instead of the second role; and moving processing from the first node to the second node after adapting the second node to function in the first role instead of the second role;

determining whether a third performance value of a third node of the network is greater than a third threshold, where the third node functions in the first role, the second role, or a third role;

identifying a fourth node of the network when the third performance value is greater than the third threshold; and adapting the fourth node to function in a same role as the third node.

* * * * *